United States Patent [19]

Engel et al.

[11] Patent Number: 4,720,292
[45] Date of Patent: Jan. 19, 1988

[54] CYLINDRICAL AIR FILTER WITH LIGHTWEIGHT HOUSING AND RADIALLY DIRECTED SEAL

[75] Inventors: Donald F. Engel, Prior Lake; Steven S. Gieseke, Richfield, both of Minn.

[73] Assignee: Donaldson Company, Inc., Minneapolis, Minn.

[21] Appl. No.: 884,992

[22] Filed: Jul. 14, 1986

[51] Int. Cl.$^4$ ............................................. B01D 46/02
[52] U.S. Cl. .................................... 55/337; 55/498; 55/502; 55/510; 55/514; 55/518
[58] Field of Search ................. 55/337, 498, 502, 510, 55/514, 518, 519

[56] References Cited

U.S. PATENT DOCUMENTS

| | | | |
|---|---|---|---|
| 3,078,650 | 2/1963 | Anderson et al. | 55/337 |
| 3,169,844 | 2/1965 | Young | 55/498 |
| 3,672,130 | 6/1972 | Sullivan et al. | 55/337 X |
| 4,128,251 | 12/1978 | Maither et al. | 55/502 X |
| 4,135,899 | 1/1979 | Gauer | 55/482 |
| 4,159,197 | 6/1979 | Schuler et al. | 55/502 X |
| 4,211,543 | 7/1980 | Tokar et al. | 55/485 |
| 4,227,898 | 10/1980 | Kamekawa et al. | 55/337 X |
| 4,235,611 | 11/1980 | Brownell | 55/337 X |
| 4,350,509 | 9/1982 | Alseth et al. | 55/337 |
| 4,488,889 | 12/1984 | McCarroll | 55/502 |
| 4,491,460 | 1/1985 | Tokar | 55/337 |
| 4,609,465 | 9/1986 | Miller | 55/502 X |

Primary Examiner—Charles Hart
Attorney, Agent, or Firm—Merchant, Gould, Smith, Edell, Welter & Schmidt

[57] ABSTRACT

An air filter including a generally tubular filter element having an open air outlet end and a closed end is provided with a molded ring-like end cap of a soft elastomer material. A tubular air outlet member is mounted in the open end of the filter element with the end cap having a radially inwardly facing surface constructed so as to be compressed to sealingly engage the outlet member to block flow of contaminated air therebetween. A housing having an air inlet surrounds the filter element to provide an air distribution chamber for incoming contaminated air.

10 Claims, 3 Drawing Figures

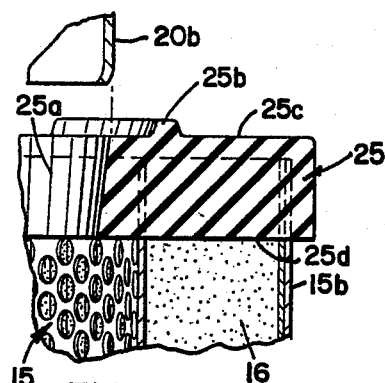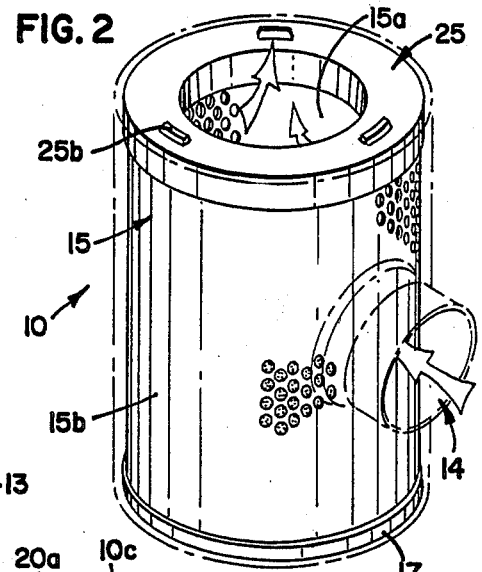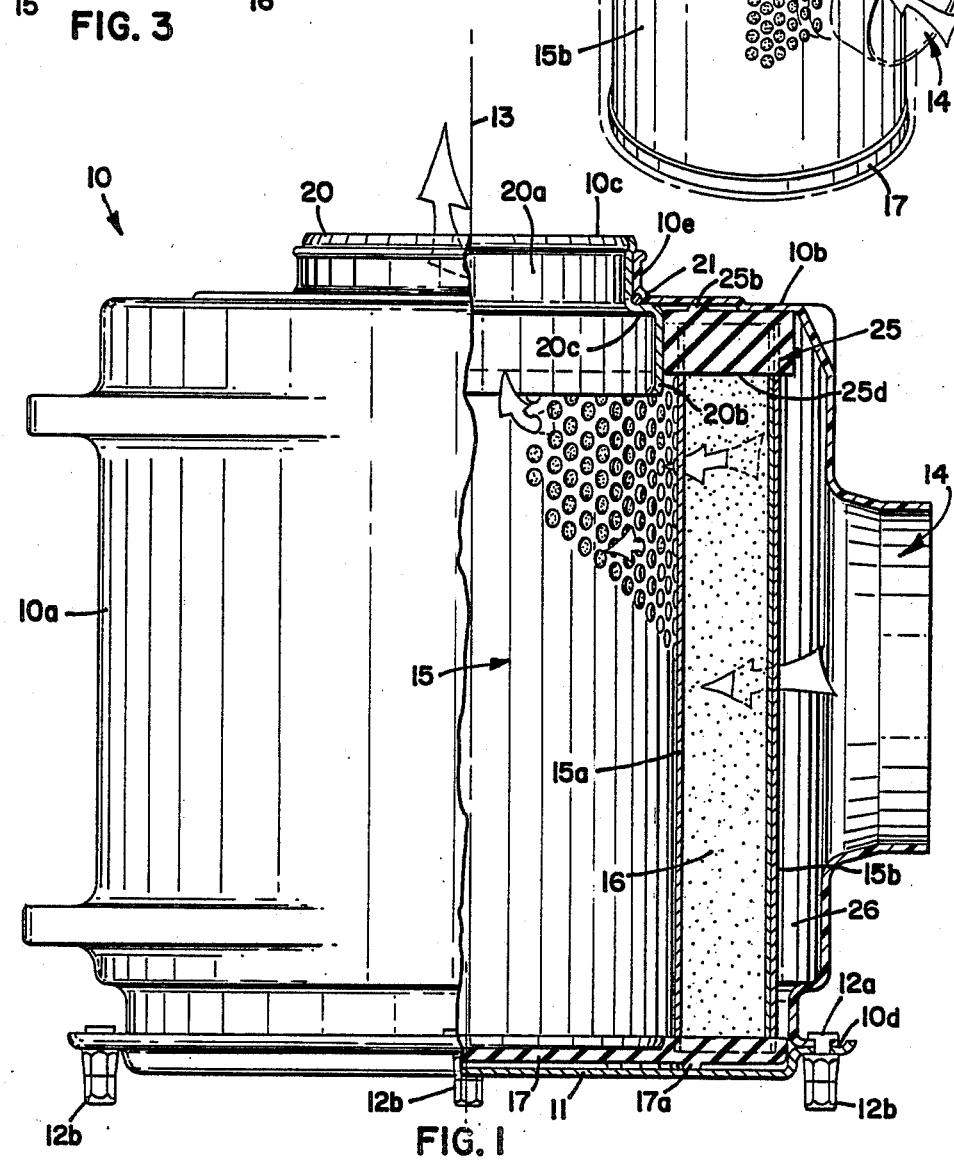

CYLINDRICAL AIR FILTER WITH LIGHTWEIGHT HOUSING AND RADIALLY DIRECTED SEAL

BACKGROUND OF THE INVENTION

This invention relates generally to air cleaners or filters and more particularly relates to air cleaners with cylindrical, pleated paper filter elements used primarily with over-the-road trucks and agricultural tractors. In such air cleaners, the air is drawn into a housing and radially inwardly through the filter element for axial discharge therefrom. The cylindrical air filter element is sealed within the housing so that all air entering the housing must pass through the walls of the filter element.

In the prior art, sealing of the filter element in the housing has been accomplished by compressing the outlet end of the filter element against the end wall of the housing, and by providing a gasket between the end of the filter element and the housing end wall. An example of this is shown in the Anderson et al. U.S. Pat. No. 3,078,650, issued Feb. 26, 1963, in which a yoke assembly cooperating with a threaded wing bolt and nut is used to compress the filter element against the end wall of the housing to prevent leakage of air around the filter element. Various other latches and clamping devices have been used to effect a positive clean air seal in such filter assemblies. Using such state of the art axial compression sealing techniques requires filter elements constructed so as not to collapse under compression, and requires the use of relatively heavy-gauge steel in the housing to withstand the pressures. Because both the filter housing and the filter element must be strong and rigid when using such techniques, improvements in the area of low-cost, lightweight elements and housings have been hampered. With respect to the housings, non-engineering grades of plastics as well as some molding processes could not be safely utilized.

SUMMARY OF THE INVENTION

The present invention provides an air cleaner construction wherein the positive clean air seal is established between the radially inwardly facing surface of the filter element end cap and the tubular air outlet member so that there is no need to compress the filter element as in the prior art to achieve a seal between the end of the filter element and the housing. In the preferred embodiment, this is accomplished by molding the ring-like end cap at the open end of the filter element from a urethane foam material having a relatively soft, rubber-like consistency, the cylindrical inner surface thereof being constructed and arranged to fit over and sealingly engage an inner end portion of a tubular air outlet member. A relatively lightweight housing can then be provided to channel the flow of air through the filter element. The housing can be dimensionally unstable because the housing does not have to support any clamping forces as in the prior art. No mechanical aids or clamps are necessary to exert outside force because the seal is self-generated when the end cap is inserted over the tubular outlet member, and the sealing forces are enhanced by the air pressure differential exerted on the filter element during operation thereof. As a result, the housing can be constructed from a relatively light plastic material or from a thinner metal. The structural requirements of the filter element are also reduced because it does not have to withstand mechanical compression.

The Gauer U.S. Pat. No. 4,135,899, issued Jan. 23, 1979, discloses a typical prior art clamping arrangement for holding both a primary filter and a safety filter in a cylindrical housing. The safety filter of the Gauer device has an annular resilient mounting member 133 with an internal groove adapted to engage a bead on the end of the air outlet tube. However, this connection is not relied upon or designed to provide a positive clean air seal. The axially outer end of member 133 has a flattened surface to sealingly engage the end wall of the housing. The radially extending lip 134 of member 133 is compressed against the end wall of the housing by means of a clamping arrangement similar to that heretofore described. Thus, the Gauer patent does not teach or suggest the desirability of utilizing a radially inwardly directed seal in order to eliminate the clamping device.

The present invention provides the designer with a variety of inherent lightweight design options having a performance equivalent to air cleaners designed according to the state of the art. The design is compatable to non-metallic I.E. commodity (non-engineering grade) plastic housings with large expansion/contraction ratios. The lightweight plastic housing and element have good vibration dampening/absorption characteristics, further enhancing minimal housing structure requirements. Another advantage is that the gasket is located inside of the filter element so that it is protected during shipping and handling.

BRIEF DESCRIPTION OF THE DRAWINGS

FIG. 1 is a view in side elevation of an air cleaner according to the invention, portions thereof being broken away and portions being shown in section;

FIG. 2 is a view in perspective of a filter element according to the invention, with portions of the housing being shown schematically in broken lines; and FIG. 3 is an enlarged fragmentary portion of the outlet area showing the tubular outlet member removed from the resilient end cap.

DESCRIPTION OF THE PREFERRED EMBODIMENT

Referring now to the drawings, wherein like reference numerals are used throughout the several views to indicate like elements of the invention, there is disclosed in FIG. 1 an air cleaner or filter having a housing 10 with a generally cylindrical outer wall 10a, a first generally closed end 10b comprising a generally circular end wall having an axial outlet opening 10c, and a generally open second end having a circular outwardly extending flange 10d to which is connected a removable cover 11 by means of a plurality of threaded bolts 12a and plastic nuts 12b. Housing 10 is cylindrical with respect to a longitudinal axis 13. Formed in the outer wall 10a is a peripheral air inlet opening 14.

A generally tubular or cylindrical filter element 15 is carried within housing 10 coaxial therewith. Filter element 15 has an inner liner 15a and an outer liner 15b, both being cylindrical, and both being constructed from perforated metal. A cylindrical pleated paper filter 16 is mounted between the inner liner 15a and the outer liner 15b. Filter element 15 has a closed end 17 in the form of a circular cap of a urethane foam material molded thereon and having a relatively soft, rubber-like consistency. Cap 17 is molded over and holds together the ends of liners 15a, 15b and filter 16 and extends across that end of the filter element 15 to provide a closed end. Cap 17 has a plurality of protrusions 17a extending axially outwardly therefrom for contact with the cover 11. The diameter of housing 10 around cap 17 is about the same as the outside diameter of the cap 17 to hold filter element 15 centered within the housing.

Closed end wall 10b is provided with an axially outwardly extending tubular portion 10e around axial air outlet opening 10c. A generally cylindrical outlet member 20 is mounted in outlet opening 10c having an outer smaller diameter portion 20a and an inner larger diameter portion 20b connected by a planar ring portion 20c. The axially outer end of outer portion 20a is formed to be of slightly larger diameter to provide a wide groove between it and ring portion 20c which conforms in shape and size to the inner surface of tubular portion 10e of housing 10 so that when tubular member 20 is inserted into axial opening 10c from the interior of housing 10 the outer portion 20a thereof snaps over and snugly engages tubular portion 10e, and ring portion 20c engages the inner surface of housing end wall 10b to hold the tubular member 20 in place. The housing is shaped at the junction of wall 10b and tubular portion 10e to provide a circular opening for an O-ring seal 21 which functions to prevent air leakage between housing 10 and tubular member 20. When mounted in place as shown in FIG. 1, the inner portion 20b of tubular member 20 extends a short distance into the interior of filter element 15 coaxially therewith.

The open end of filter element 15, adjacent closed end 10b of the housing 10, is provided with a ring-like end cap 25 which is molded over the ends of the liners 15a, 15b and pleated paper filter 16. End cap 25 is preferably made from an elastomer such as a urethane foam material having a relatively soft, rubber-like consistency so that it is capable of functioning as a seal or gasket material. End cap 25, as shown in FIG. 3, is preferably molded so as to have a radially inwardly facing surface between the end edges thereof, most of which has a diameter slightly smaller than the outer diameter of inner portion 20b of tubular member 20. In the preferred embodiment the inwardly facing surface 25a has a diameter at the outer face 25c of end cap 25 of about the same size as the outer diameter of the tubular member 20 and a gradually reducing diameter toward the inner face 25d of end cap 25 which is less than the outside diameter of member 20. The elastomer material of end cap 25 is thus compressed at the surface 25a to provide a positive clean air seal between the end cap 25 and the outlet member 20. As also shown in FIG. 3, the innermost end of portion 20b is formed to have a slightly smaller diameter so that end cap 25 can easily be inserted over portion 20b. End cap 25 thus has a generally cylindrical inner surface 25a of gradually reducing diameter from outside to inside constructed and arranged to fit over and sealingly engage the inner portion 20b of outlet member 20 to thus provide a positive air seal between the end cap 25 and inner portion 20b of outlet member 20.

End cap 25 is also provided with a plurality of axially outwardly extending, arcuate projections or protrusions 25b which engage end wall 10b to hold the filter element in place. The relationship between end cap 25 and tubular outlet member 20 maintains filter element 15 in a coaxial relationship with housing 10 at the outlet end of the air cleaner.

The distance between closed end 10b of housing 10 and cover 11 is such as to lightly compress the projections or protrusions 17a, 25b to minimize or dampen axial movements of filter element 15 in the housing 10.

With the air cleaner assembled as shown in FIG. 1, the engine draws air through the filter assembly from housing inlet 14 into a distribution chamber 26 formed between outer wall 10a and outer liner 15b. The contaminated incoming air is thus distributed generally evenly over the outer surface of filter element 15 and is drawn through the pleated paper filter 16 into the interior of filter element 15 for discharge through outlet opening 10c. All of the foreign material carried by the incoming air is thus deposited on the pleated paper filter 16. It is important that all of the incoming air be passed through the filter, because if the dirty incoming air is permitted to escape around the filter, the engine may be damaged. The dirty air cannot escape around the filter at the closed end because that end is completely covered by cap 17. At the air outlet end of the housing, however, it is necessary to provide a seal between the filter element 15 and the housing 10 to prevent leakage therebetween. In the present case, that seal is provided by the tight engagement of inner peripheral wall 25a of gasket 25 with the outer peripheral wall of portion 20b of tubular outlet member 20. This sealing relationship is enhanced by the pressure differential between the inlet and outlet of the air cleaner during operation of the system. Because a positive clean air seal is achieved as just described, there is no need to clamp the filter element 15 tightly against the end wall 10b. Thus, no expensive clamping devices are required, and only light pressure against the ends of the filter element need be maintained to minimize movement within the housing. In the preferred embodiment as shown in the drawings, the housing 10 is constructed from a commodity grade plastic material. Such a material would ordinarily not be strong enough to provide the axial compression sealing required by the prior art techniques. With the present sealing technique, however, such strength is not required, so that a lesser material can be used for the housing. In the embodiment of the invention shown in the drawings, a standard filter element has been shown because that construction is available. The standard filter element 15 uses relatively heavy perforated metal liners 15a, 15b in order to withstand the standard compression sealing techniques. However, it should be understood that the structure of the filter element might also be modified as development of this invention progresses because the same strength and rigidity is not required using the new sealing technique. The filter element must be strong enough to withstand the pressures caused by air flow therethrough, but it is no longer necessary to withstand the axial compression forces.

Although a preferred embodiment of the invention has been disclosed, it will be understood that the same is capable of modification without departure from the scope and spirit of the invention as defined in the claims.

What is claimed is:

1. An air filter, comprising:
   (a) a lightweight housing having a longitudinal axis, a first generally closed end having an axial outlet opening, a generally open second end closeable by a removeable cover, and a peripheral air inlet opening;
   (b) a generally cylindrical filter element comprising an inner liner, a filter and an outer liner, carried within said housing coaxial therewith, having a first end engageable with said closed end of said housing and having a second, closed end engageable with said cover;

(c) said closed end of said housing comprising a cylindrical outlet member in said outlet opening having a short inner portion extending axially inwardly into said housing and said filter element, said inner portion having a first outside diameter; and (d) said first end of said filter element comprising a ring-like end cap having a relatively soft, rubber-like consistency, said end cap having a generally cylindircal radially inwardly facing surface of a diameter smaller than said first diameter and constructed and arranged to fit over said inner portion of said outlet member and to be compressed between said inner portion and said inner liner to sealingly engage said inner portion of said outlet member whereby air flowing from said air inlet into said housing is forced to flow through said filter element to said outlet opening.

2. The air filter of claim 1 wherein said end cap includes a plurality of projections extending axially therefrom for engagement with said closed end of said housing.

3. The air filter of claim 2 wherein said closed end of said filter element comprises a cap having a consistency like that of said end cap, extending over and closing said closed end of said filter element, said cap having a plurality of projections extending axially therefrom for engagement with said cover.

4. The air filter of claim 3 wherein the distance between said closed end of said housing and said cover is such as to lightly compress said projections and said cap to minimize movement of said filter in said housing.

5. The air filter of claim 4 wherein said end cap and said cap are molded from an elastomer material.

6. The air filter of claim 5 wherein the elastomer material is a urethane foam.

7. An air filter, comprising:
(a) a generally tubular filter element comprising a filter and a supporting liner and having an open air outlet end and a closed end;
(b) said open end of said filter element having a ring-like end cap of a soft elastomer material;
(c) housing means including a tubular air outlet member extending into said open end of said filter element, said end cap having a radially inwardly facing surface constructed and arranged to be compressed between said air outlet member and said liner to sealingly engage said air outlet member to block flow of contaminated air therebetween; and
(d) said housing means surrounding said filter element to provide an air distribution chamber around said filter element, and having an air inlet opening to provide a flow of air to said distribution chamber and through said filter element.

8. The air filter of claim 7 wherein said radially inwardly facing surface has at least a portion thereof with an inside diameter smaller than an outer diameter of said outlet member whereby said elastomer material is compressed to provide a positive clean air seal between said end cap and said outlet member.

9. The air filter of claim 8 wherein said end cap has an outer face and an inner face with said radially inwardly facing surface extending therebetween to define said air outlet, said air outlet at said outer face having a diameter of about the same size as having outlet member, said air outlet at said inner face having a smaller diameter, said radially inwardly facing surface being gradually reduced in diameter therebetween.

10. An air filter, comprising:
(a) a generally tubular filter element having an open air outlet end and a closed end;
(b) said open end of said filter element having a ring-like end cap of a soft rubber-like material;
(c) housing means including a tubular air outlet member, having a first outer diameter, extending into said open end of said filter element, said end cap defining an opening having a radially inwardly facing surface with a diameter smaller than said first diameter, and constructed and arranged to be compressed to sealingly engage said air outlet member to block flow of contaminated air therebetween; and
(d) said housing means surrounding said filter element to provide an air distribution chamber around said filter element, and having an air inlet opening to provide a flow of air to said distribution chamber and through said filter element.

* * * * *

REEXAMINATION CERTIFICATE (1551st)
United States Patent [19]
Engel et al.

[11] B1 4,720,292
[45] Certificate Issued  Sep. 10, 1991

[54] CYLINDRICAL AIR FILTER WITH LIGHTWEIGHT HOUSING AND RADIALLY DIRECTED SEAL

[75] Inventors: Donald F. Engel, Prior Lake; Steven S. Gieseke, Richfield, both of Minn.

[73] Assignee: Donaldson Company, Inc.

Reexamination Request:
No. 90/002,095, Jul. 23, 1990

Reexamination Certificate for:
Patent No.: 4,720,292
Issued: Jan. 19, 1988
Appl. No.: 884,992
Filed: Jul. 14, 1986

[51] Int. Cl.$^5$ ............................................. B01D 46/02
[52] U.S. Cl. ................................. 55/337; 55/498; 55/502; 55/510; 55/514; 55/518
[58] Field of Search ............... 55/337, 498, 502, 510, 55/514, 518, 519

[56] References Cited
U.S. PATENT DOCUMENTS

| | | | |
|---|---|---|---|
| 3,078,650 | 2/1963 | Anderson et al. | 55/337 |
| 3,169,844 | 2/1965 | Young | 55/498 |
| 3,672,130 | 6/1972 | Sullivan et al. | 55/337 X |
| 4,128,251 | 12/1978 | Maither et al. | 55/502 X |
| 4,135,899 | 1/1979 | Gauer | 55/482 |
| 4,159,197 | 6/1979 | Schuler et al. | 55/502 X |
| 4,211,543 | 7/1980 | Tokar et al. | 55/485 |
| 4,227,898 | 10/1980 | Kamekawa et al. | 55/337 X |
| 4,235,611 | 11/1980 | Brownell | 55/337 X |
| 4,350,509 | 9/1982 | Alseth et al. | 55/337 |
| 4,488,889 | 12/1984 | McCarroll | 55/502 |
| 4,491,460 | 1/1985 | Tokar | 55/337 |
| 4,609,465 | 9/1986 | Miller | 55/502 X |
| 4,720,292 | 1/1988 | Engel et al. | 55/337 |

FOREIGN PATENT DOCUMENTS 2268551 11/1975 France.
2261041 12/1975 France.
59-141150 9/1984 Japan.

*Primary Examiner*—Charles Hart

[57] ABSTRACT

An air filter including a generally tubular filter element having an open air outlet end and a closed end is provided with a molded ring-like end cap of a soft elastomer material. A tubular air outlet member is mounted in the open end of the filter element with the end cap having a radially inwardly facing surface constructed so as to be compressed to sealingly engage the outlet member to block flow of contaminated air therebetween. A housing having an air inlet surrounds the filter element to provide an air distribution chamber for incoming contaminated air.

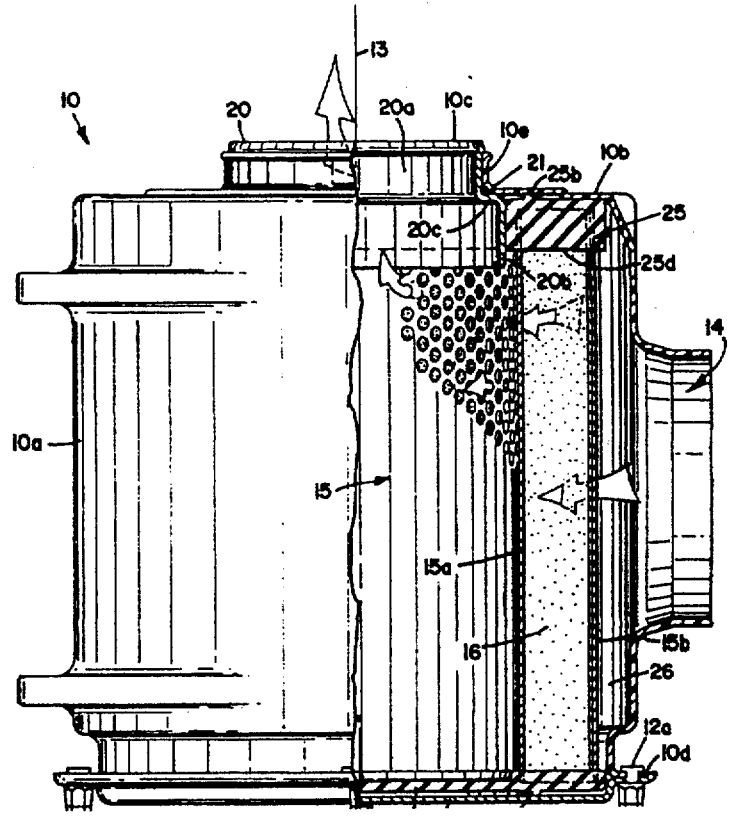

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 to 10 are cancelled.

New claims 11 to 28 are added and determined to be patentable.

11. *An air filter, comprising:*
   (a) *a lightweight housing having a longitudinal axis, a first generally closed end having an axial outlet opening, a generally open second end closeable by a removable cover, and a peripheral air inlet opening;*
   (b) *a generally cylindrical element comprising: an inner liner; a filter; and, an outer liner; said cylindrical element being carried within said housing and coaxial therewith and having a first end engageable with said closed end of said housing and having a second, closed end engageable with said cover;*
   (c) *said closed end of said housing comprising a cylindrical outlet member in said outlet opening having a short inner portion extending axially inwardly into said housing and said filter element, said inner portion having a first outside diameter; and,*
   (d) *said first end of said filter element comprising a ring-like end cap having a relatively soft, rubber-like consistency.*
      (i) *said end cap having a generally soft, rubber-like radially inwardly facing elastomer end cap portion having a cylindrical radially inwardly facing surface of a diameter smaller than said first diameter; said elastomer end cap portion being constructed and arranged to fit over said inner portion of said outlet member and said inner liner to sealingly engage said inner portion of said outlet member by compression of said soft, rubber-like, end cap portion between and against said inner liner and said outlet member inner portion;*
      (ii) *whereby air flowing from said air inlet into said housing is forced to flow through said filter element to said outlet opening.*

12. *An air filter according to claim 11 wherein said soft, rubber-like, inwardly facing elastomer end cap portion includes a ring of foam material adjacent said inner liner.*

13. *An air filter according to claim 12 wherein said soft, rubber-like, inwardly facing elastomer end cap portion comprises foam material extending between and against both of said inner liner and said outlet member inner portion.*

14. *An air filter according to claim 11 wherein said soft, rubber-like, inwardly facing elastomer end cap portion comprises urethane foam.*

15. *The air filter of claim 11 wherein said end cap includes at least one projection extending axially therefrom for engagement with said closed end of said housing.*

16. *The air filter of claim 15 wherein said second, closed, tency like that of said end cap, extending over and closing said closed end of said filter element, said cap having at least one projection extending axially therefrom for engagement with said cover.*

17. *The air filter of claim 16 wherein the distance between said closed end of said housing and said cover is such as to lightly compress said projection in said cap over said second, closed, end of said filter element to inhibit movement of said filter in said housing.*

18. *The air filter of claim 16 wherein the distance between said closed end of said housing and said cover is such as to lightly compress said projection in said cap over said second, closed, end of said filter element to inhibit movement of said filter in said housing without establishing a fluid seal between said end cap and said closed end of said housing.*

19. *An air filter according to claim 11 wherein the distance between said closed end of said housing and said cover is such that no compressive fluid seal is established between said cap of said filter closed end and said housing cover.*

20. *An air filter according to claim 19 wherein said distance is such as to lightly compress said filter element to inhibit axial movement thereof.*

21. *An air filter according to claim 11 wherein the distance between said closed end of said housing and said cover is such as to lightly compress said filter element to inhibit axial movement thereof.*

22. *An air filter according to claim 11 wherein said radially inwardly facing end cap portion has an outer face and an inner face with said radially inwardly facing surface extending therebetween to define an air outlet; said air outlet at said outer face having a diameter of about the same size as said outlet member; said air outlet at said inner face having a smaller diameter, said radially inwardly facing surface being gradually reduced in diameter therebetween.*

23. *An air filter according to claim 11, wherein said end cap is compressed to create a fluid seal between said inner liner and said outlet member such that said cylindrical element is allowed to radially vibrate without disturbing said seal.*

24. *An air filter comprising:*
   (a) *a generally tubular filter element comprising a filter and a supporting inner liner and having an open air outlet end and a closed end;*
   (b) *said open air outlet end of said filter element having a ring-like end of cap of a soft elastomer material; said ring-like end cap including a generally soft, rubber-like, radially inwardly facing elastomer end cap portion positioned against said supporting inner liner; said end cap portion including a radially inwardly facing surface;*
   (c) *housing means comprising a housing having a closed end and an axial outlet opening; said outlet opening comprising a tubular air outlet member having an inner portion extending axially inwardly into said housing and said filter element, said inner portion having a first outside diameter;*
   (d) *said housing means surrounding said filter element to provide an air distribution chamber around said filter element, and having an air inlet opening to provide a flow of air to said distribution chamber and through said filter element; and,*
   (e) *said inwardly facing elastomer end cap portion having a diameter smaller than said first diameter and* portion of said outlet member to sealingly engage said inner portion of said outlet member by compression of said soft, rubber-like, end cap portion between and against said inner liner and said outlet member inner portion, with said end cap portion radially inwardly facing surface pressed against said air outlet member to sealingly engage said air outlet member to block flow of contaminated air therebetween.

25. An air filter according to claim 24 wherein:

(a) said housing means includes a first end and a second end, a distance between said housing means first and second ends being such as to lightly compress said filter element therebetween, without establishing thereby compressive fluid seal between said housing second end and said filter element; said housing means second end being an end remote from said housing means tubular air outlet member.

26. An air filter according to claim 24 wherein said end cap sealing portion comprises an elastomer foam.

27. An air filter according to claim 24 wherein said end cap sealing portion comprises urethane foam.

28. The air filter of claim 24 wherein said end cap sealing portion has an outer face and an inner face with said radially inwardly facing surface extending therebetween to define said air outlet; said air outlet at said outer face having a diameter of about the same size as said outlet member; said air outlet at said inner face having a smaller diameter, said radially inwardly facing surface being gradually reduced in diameter therebetween.

* * * * *

REEXAMINATION CERTIFICATE (2224th)
United States Patent [19]
Engel et al.

[11] B2 4,720,292
[45] Certificate Issued Feb. 22, 1994

[54] CYLINDRICAL AIR FILTER WITH LIGHTWEIGHT HOUSING AND RADIALLY DIRECTED SEAL

[75] Inventors: Donald F. Engel, Prior Lake; Steven S. Gieseke, Richfield, both of Minn.

[73] Assignee: Donaldson Company, Inc., Minneapolis, Minn.

Reexamination Request:
No. 90/002,950, Jan. 29, 1993

Reexamination Certificate for:
Patent No.: 4,720,292
Issued: Jul. 14, 1986
Appl. No.: 884,992
Filed: Jan. 19, 1988

Reexamination Certificate B1 4,720,292 issued Sep. 10, 1991.

[51] Int. Cl.$^5$ ............................................. B01D 46/02
[52] U.S. Cl. .................................... 55/337; 55/498; 55/502; 55/510; 55/514; 55/518
[58] Field of Search ................. 55/337, 498, 502, 510, 55/514, 518, 519, 521

[56] References Cited

U.S. PATENT DOCUMENTS

| | | |
|---|---|---|
| 1,322,361 | 11/1919 | Sherman . |
| 1,580,291 | 4/1926 | Dollinger . |
| 1,714,854 | 5/1929 | Dollinger . |
| 1,830,095 | 11/1931 | Dollinger . |
| 2,421,776 | 6/1947 | Dollinger . |
| 2,464,036 | 3/1949 | Hasselwander . |
| 2,732,031 | 1/1956 | Rabbitt et al. . |
| 2,871,976 | 2/1959 | Sebok . |
| 2,896,738 | 7/1959 | Sebok . |
| 2,962,121 | 11/1960 | Wilbur ............................ 55/498 X |
| 3,078,650 | 2/1963 | Anderson et al. ............... 55/337 |
| 3,104,966 | 9/1963 | Goulet et al. . |
| 3,147,100 | 9/1964 | Wilber . |
| 3,160,488 | 12/1964 | Wilber . |
| 3,169,844 | 2/1965 | Young ............................. 55/498 |
| 3,201,927 | 8/1965 | Wachter . |
| 3,212,242 | 10/1965 | Florine . |
| 3,226,917 | 1/1966 | Donovan . |
| 3,278,032 | 10/1966 | Smith . |
| 3,296,781 | 1/1967 | Schumann . |
| 3,355,863 | 12/1967 | Pittsley . |
| 3,413,780 | 12/1968 | Amlott . |
| 3,413,782 | 12/1968 | Bartlett . |
| 3,488,928 | 1/1970 | Tarala . |
| 3,502,218 | 3/1970 | Tuffnell . |
| 3,505,794 | 4/1970 | Nutter . |
| 3,541,765 | 11/1970 | Adler . |
| 3,616,618 | 11/1971 | Gronholz . |
| 3,672,130 | 6/1972 | Sullivan et al. . |
| 3,745,753 | 7/1973 | Risse . |
| 3,888,765 | 6/1975 | Bolk . |
| 4,128,251 | 12/1978 | Maither et al. ................... 55/502 X |
| 4,135,899 | 1/1979 | Gauer ............................... 55/482 |
| 4,159,197 | 6/1979 | Schuler et al. ................... 55/502 X |
| 4,204,960 | 5/1980 | Sugiyama et al. . |
| 4,211,543 | 7/1980 | Tokar et al. ...................... 55/485 |
| 4,227,898 | 10/1980 | Kamekawa et al. ............. 55/337 X |
| 4,235,611 | 11/1980 | Brownell .......................... 55/337 X |
| 4,312,651 | 1/1982 | Esaki et al. . |
| 4,350,509 | 9/1982 | Alseth et al. ..................... 55/337 X |
| 4,369,113 | 1/1983 | Stifelman . |
| 4,488,889 | 12/1984 | McCarroll ......................... 55/502 |
| 4,491,460 | 1/1985 | Tokar ................................ 55/337 |
| 4,526,378 | 7/1985 | Fisher et al. . |
| 4,594,083 | 6/1986 | Hiraizumi . |
| 4,609,465 | 9/1986 | Miller ............................... 55/502 X |
| 4,720,292 | 1/1988 | Engel et al. ...................... 55/337 |
| 4,759,783 | 7/1988 | Machado . |
| 4,834,885 | 5/1989 | Misgen et al. . |
| 4,871,381 | 10/1989 | Smith . |
| 5,037,460 | 8/1991 | Machado . |
| 5,041,221 | 8/1991 | Drusi . |
| 5,064,458 | 11/1991 | Machado . |
| 5,071,456 | 12/1991 | Binder et al. . |
| 5,120,337 | 6/1992 | Benzler et al. . |
| 5,137,557 | 8/1992 | Behrendt et al. . |
| 5,160,519 | 11/1992 | Svensson et al. . |
| 5,167,683 | 12/1992 | Behrendt et al. . |

FOREIGN PATENT DOCUMENTS

| | | |
|---|---|---|
| 162813 | 1/1953 | Austria . |
| 545333 | 8/1956 | Belgium . |
| 650432 | 10/1960 | Canada . |
| 671029 | 1/1939 | Fed. Rep. of Germany . |
| 809796 | 8/1951 | Fed. Rep. of Germany . |
| 1030620 | 5/1958 | Fed. Rep. of Germany . |

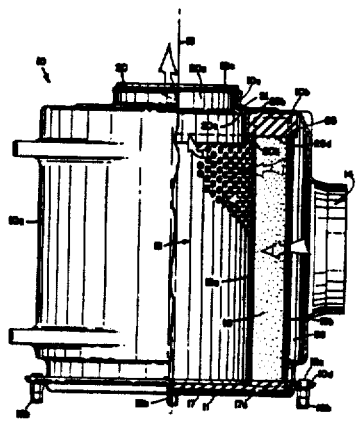

| | | |
|---|---|---|
| 2445454 | 4/1976 | Fed. Rep. of Germany . |
| 2852385 | 1/1980 | Fed. Rep. of Germany . |
| 3934433 | 4/1991 | Fed. Rep. of Germany . |
| 3936837A1 | 4/1991 | Fed. Rep. of Germany . |
| 1100273 | 9/1955 | France . |
| 1131647 | 2/1957 | France . |
| 1291243 | 3/1962 | France . |
| 2214505 | 8/1974 | France . |
| 2268551 | 11/1975 | France . |
| 2261041 | 12/1975 | France . |
| 491730 | 3/1954 | Italy . |
| 558893 | 3/1957 | Italy . |
| 59-141150 | 9/1984 | Japan . |
| WO91/00423 | 1/1991 | PCT Int'l Appl. . |
| WO91/00424 | 1/1991 | PCT Int'l Appl. . |
| WO91/00425 | 1/1991 | PCT Int'l Appl. . |
| 329099 | 5/1930 | United Kingdom . |
| 680211 | 10/1952 | United Kingdom . |
| 720193 | 12/1954 | United Kingdom . |
| 754496 | 8/1956 | United Kingdom . |
| 799119 | 7/1958 | United Kingdom . |
| 1124735 | 8/1968 | United Kingdom . |
| 1499922 | 2/1978 | United Kingdom . |
| 2005777A | 4/1979 | United Kingdom . |
| 2110110 | 6/1983 | United Kingdom . |
| 2163368A | 2/1986 | United Kingdom . |

OTHER PUBLICATIONS

Sears Craftsman 20" Power-Propelled Lawn Mower Owner's Manual (Model No. 917.372100)–published Aug. 20, 1984.

Sears Craftsman Engine Owner's Manual (Model No. 143.354212)–published Feb. 1, 1985.

Photocopy of photographs of Sears replacement air filter model 71-3331 taken by Requestor's Representatives (4 pages/7 photographs) (no date).

*Primary Examiner*—Charles Hart

[57]  ABSTRACT

An air filter including a generally tubular filter element having an open air outlet end and a closed end is provided with a molded ring-like end cap of a soft elastomer material. A tubular air outlet member is mounted in the open end of the filter element with the end cap having a radially inwardly facing surface constructed so as to be compressed to sealingly engage the outlet member to block flow of contaminated air therebetween. A housing having an air inlet surrounds the filter element to provide an air distribution chamber for incoming contaminated air.

REEXAMINATION CERTIFICATE ISSUED UNDER 35 U.S.C. 307

THE PATENT IS HEREBY AMENDED AS INDICATED BELOW

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-10 were previously cancelled.

Claims 11 and 24 are determined to be patentable as amended.

Claims 12-23 and 25-28, dependent on an amended claim, are determined to be patentable.

New claims 29-50 are added and determined to be patentable.

11. An air filter, comprising:
(a) a lightweight housing having a longitudinal axis, a first generally closed end having an axial outlet opening, a generally open second end closeable by a removable cover, and a peripheral air inlet opening;
(b) a generally cylindrical *filter* element comprising: an inner liner; a filter; and, an outer liner; said cylindrical *filter* element being carried within said housing and coaxial therewith and having a first end engageable with said closed end of said housing and having a second, closed end engageable with said cover;
(c) said closed end of said housing comprising a cylindrical outlet member in said outelt opening having a short inner portion extending axially inwardly into said housing and said *cylindrical* filter element, said inner portion having a first outside diameter; and,
(d) said first end of said *cylindrical* filter element comprising a ring-like end cap having a relatively soft, rubber-like consistency,
(i) said end cap having a generally soft, rubber-like radially inwardly facing elastomer end cap portion having a cylindrical radially inwardly facing surface of a diameter smaller than said first diameter; said elastomer end cap portion being constructed and arranged to fit over said inner portion of said outlet member and said inner liner to sealingly engage said inner portion of said outlet member by compression of said soft, rubber-like, end cap portion between and against said inner liner and said outlet member inner portion *whereby a radial seal is formed;*
(ii) whereby air flowing from said air inlet into said housing is forced to flow through said filter element to said outlet opening.

24. An air filter comprising:
(a) a generally tubular filter element comprising a filter and a supporting inner liner and having an open air outlet end and a closed end;
(b) said open air outlet end of said filter element having a ring-like end [of] cap of a soft elastomer material; said ring-like end cap including a generally soft, rubber-like, radially inwardly facing elastomer end cap portion positioned against said supporting inner liner; said end cap portion including a radially inwardly facing surface;
(c) housing means comprising a housing having a closed end and an axial outlet opening; said outlet opening comprising a tubular air outlet member having an inner tubular portion extending axially inwardly into said housing and said filter element, said inner portion having a first outside diameter;
(d) said housing means surrounding said filter element to provide an air distribution chamber around said filter element, and having an air inlet opening to provide a flow of air to said distribution chamber and through said filter element; and,
(e) said inwardly facing elastomer end cap portion having a diameter smaller than said first diameter and being constructed and arranged to fit over said inner portion of said outlet member to sealingly engage said inner portion of said outlet member by compression of said soft, rubber-like, end cap portion between and against said inner liner and said outlet member inner portion, with said end cap portion radially inwardly facing surface pressed against said air outlet member to sealingly engage said air outlet member *whereby a radial seal is formed* to block flow of contaminated air therebetween.

*29. An air filter according to claim 24 wherein said housing comprises a commodity grade plastic material.*

*30. An air filter according to claim 24 wherein said air outlet member comprises a commodity grade plastic material.*

*31. An air filter according to claim 24 wherein said air outlet member is separable from, and engages, a remainder of said housing.*

*32. An air filter according to claim 24 wherein said air outlet member includes means for engagement with a remainder of said housing.*

*33. An air filter according to claim 24 wherein an end portion of said housing is selectively openable, for access to said filter element.*

*34. An air filter according to claim 33 wherein said housing end portion which is selectively openable comprises an end portion opposite said axial outlet opening.*

*35. An air filter according to claim 33 wherein said end portion of said housing is selectively openable, for access to said filter element, without dismounting said filter element from said outlet member.*

*36. An air filter according to claim 24 wherein said closed end of said tubular filter element is closed by an end cap.*

*37. An air filter according to claim 24 wherein said closed end of said tubular filter element is closed by an end cap having a soft, rubber-like consistency.*

*38. An air filter according to claim 24 wherein said filter element comprises a cylindrical pleated paper filter positioned between two cylindrical, perforated metal, liners.*

*39. An air filter according to claim 24 wherein said ring-like end cap has an outer surface with at least one outwardly extending axial projection thereon, for engagement with said housing.*

*40. An air filter according to claim 11 wherein said outlet member is separable from, and engages, a remainder of said housing.*

41. An air filter according to claim 24 wherein:
(a) said tubular filter element comprises an elongate, cylindrical, pleated paper filter element having an open interior;
(b) said closed end of said tubular filter element comprises an end of said filter element, opposite said open air outlet end, closed by an end cap of soft elastomeric material;
(c) said tubular air outlet member inner tubular portion extends into said filter element interior;
  (i) said inner tubular portion of said air outlet member having an outer cylindrcial surface and an inner cylindrical surface, said inner cylindrical surface defining an inner wall of an air outlet passage from said filter element interior; and, said outer cylindrical surface defining the portion of said outlet member inner tubular portion engaged by said end cap portion to form said radial seal;
(d) said pleasted paper filter element being oriented within said housing such that air, during filtering, is directed outwardly from said outlet member in a direction parallel to a longitudinal extension of pleats in the pleated paper; and
(e) said radial seal between said air outlet member and said inwardly facing elastomer end cap comprises the only seal between said filter element and said housing to passage of contaminated air into said filter element interior.

42. An air filter according to claim 41 wherein said housing comprises a commodity grade plastic material.

43. An air filter acocrding to claim 41 wherein said air outlet member is separable from, and engages, a remainder of said housing.

44. An air filter according to claim 43 wherein an end portion of said housing is selectively openable, for access to said filter element.

45. An air filter according to claim 44 wherein said closed end of said tubular filter element is closed by an end cap having a soft, rubber-like consistency.

46. An air filter according to claim 45 wherein said filter element comprises a cylindrical pleated paper filter positioned between two cylindrical, perforated metal, liners.

47. An air filter according to claim 46 wherein said ring-like end cap has an outer surface with at least one outwardly extending axial porjection thereon, for engagement with said housing.

48. An air filter according to claim 41 wherein said closed end of said tubular filter element is closed by an end cap having a soft, rubber-like consistency.

49. An air filter according to claim 41 wherein said filter element comprises a cylindrical pleated paper filter positioned between two cylindrical, performated metal, liners.

50. An air filter according to claim 41 wherein said ring-like end cap has an outer surface with at least one outwardly extending axial projection thereon, for engagement with said housing.

* * * * *